United States Patent [19]

Marion

[11] 4,303,413
[45] Dec. 1, 1981

[54] OXYGEN GAS GENERATOR AND METHOD OF MANUFACTURING THE GAS GENERATOR

[75] Inventor: Frank A. Marion, Glendale, Ariz.

[73] Assignee: Synergy Corporation, Phoenix, Ariz.

[21] Appl. No.: 91,412

[22] Filed: Nov. 5, 1979

[51] Int. Cl.³ .......................... C10L 5/14; C10L 5/44
[52] U.S. Cl. ................................... 44/10 A; 44/16 A; 44/17; 252/186
[58] Field of Search .............. 44/15 R, 17, 1 D, 10 A, 44/16 A, 3 R, 3 B; 252/186; 423/579

[56] References Cited

U.S. PATENT DOCUMENTS

| | | | |
|---|---|---|---|
| 2,076 | 2/1885 | Gruber | 44/10 A |
| 321,027 | 6/1885 | Hignutt | 44/40 |
| 379,490 | 3/1888 | Owen | 44/10 A |
| 4,101,291 | 7/1978 | Marion | 44/17 |

*Primary Examiner*—Carl F. Dees
*Attorney, Agent, or Firm*—Ellsworth R. Roston; Charles H. Schwartz

[57] ABSTRACT

A gas generator is capable of being stored in a stable form for long periods of time without deteriorating in quality. The gas generator provides a substantial amount of gases, and particularly oxygen, carbon monoxide or carbon dioxide without producing any harmful or hazardous chemicals. The gas generator includes in some embodiments a minimum of fuel so that a maximum amount of oxygen in the generator is capable of being liberated. The oxygen is liberated by the combustion of a fuel at localized positions in a refractory binder, which has the property of preventing the salt residue from becoming molten and the oxidizer from flowing and thereby preventing the combustion from becoming extinguished.

The gas generator includes a suitable refractory material (such as clay) as a binder, a suitable oxidizer such as chlorate and a fuel having properties of combusting with oxygen liberated by the oxidizer and having a granular construction and having relatively poor thermal conductivity through the granules to provide the combustion at localized positions in the refractory material. The fuel may constitute a plant by-product having a cellular structure and a high compression strength. The fuel may specifically constitute dried plant life such as corn cobs. The gas generator is formed by mixing the refractory material, the fuel and the oxidizer without the addition of any water and then compressing the mixture into a suitable form such as briquettes.

23 Claims, No Drawings

OXYGEN GAS GENERATOR AND METHOD OF MANUFACTURING THE GAS GENERATOR

This invention relates to a gas generator. More particularly, this invention relates to a gas generator disposed in a solid form with stable properties until use and with properties of generating a gas, and particularly oxygen, without also generating hazardous or harmful chemicals. The invention also particularly relates to an oxygen generator which is capable of generating a considerably greater amount of oxygen per unit of stored volume than any of the generators of the prior art.

This invention is especially concerned with a gas generator which includes a fuel having a relatively low combustion temperature and having a relatively low thermal conductivity to facilitate localized combustion and having a relatively high compressibility to facilitate the formation, by compression, of the gas generator in briquettes. The invention further relates to a method of forming the gas generator without the addition of any water.

It is desirable in a number of different applications to generate oxygen, carbon monoxide or carbon dioxide. For example, a supply of oxygen is often desirable on a controlled basis for life-saving purposes such as for resuscitating patients or for sustaining patients who have had heart attacks. Oxygen is also desired in industrial applications such as equipment for welding, brazing, smelting or heat treating different materials. Oxygen is also desired for instituting, generating or sustaining combustion of various materials including wood, coal, coke, petrochemicals or paper products. Gases such as carbon monoxide or carbon dioxide are further desired to inflate articles such as rafts or slides for aircrafts, life vests, balloons and underwater inflation devices.

Although different types of gas generators are available, generators in the form of solid candles have certain inherent advantages. They are fairly compact and light in weight and generate significant amounts of oxygen per unit of volume. They do not generate noxious or hazardous fumes while being stored and they do not present any problems of instability so as to be explosive while being stored. In view of these advantages, oxygen generators in the form of solid candles can be easily transported and stored until placed into use.

The oxygen generators now in use in solid form generally include a fiberglas as a binder, iron powder as a fuel and a chlorate such as sodium chlorate as an oxidizer. The fiberglas has certain disadvantages as a binder. It is somewhat hydrophyllic so that it tends to retain moisture during the formation of the generator and to attract moisture after the formation of the generator. It tends to have a relatively low green strength when moist and to retain the fuel in clumps in the generator rather than allowing the fuel to be dispersed evenly throughout the generator. When the fuel in the generator burns to produce heat and to provide for the liberation of oxygen by the generator, the fiberglas tends to melt and to flow, thereby preventing the oxygen from being liberated on a controlled basis at a uniform rate. Furthermore, when the fuel in the generator burns, the moisture in the generator vaporizes and thereby inhibits the combustion. As will be seen from the subsequent discussion, the moisture also tends to react with other materials in the generator to produce hazardous or harmful chemicals.

The oxygen generators now in use include iron powder as the fuel. This is disadvantageous for certain important reasons. As the oxygen generator ages, the iron powder rusts. Iron powder as a fuel is advantageous because it can combust to the ferrous or ferric forms to generate heat and thereby liberate the oxygen in the chlorate. However, when the iron powder rusts, it becomes converted to the ferric form ($Fe_2O_3$) and is no longer combustible. The rusting of the iron powder in the oxygen generators of the prior art has been accelerated by the inclusion of moisture in the generator, particularly since the iron powder and the moisture have been included in the presence of a strong oxidizer such as sodium chlorate. As a result, the oxygen generators in solid form have had only a limited shelf life.

A chemical has generally been included in the oxygen generators now in use to inhibit the generation of noxious fumes. This catalyst has been primarily barium peroxide ($BaO_2$). However, when the oxygen generator of the prior art has been formed, some water has been mixed with the other chemicals to facilitate the formation of the oxygen generator. The water has reacted with the barium peroxide to form barium hydroxide ($Ba(OH)_2$). The barium hydroxide in turn has reacted with additional molecules of water to form barium hydroxide octahydrate ($Ba(OH)_2 \cdot 8H_2O$).

The water in the barium hydroxide octahydrate can only be removed at a relatively high temperature in the order of 550° C. This temperature is considerably higher than the temperature (approximately 245° C.) at which the mixture of the fuel (iron powder) and the chlorate in the oxygen generator decomposes exothermically or, in other words, autoignites. As a result, if any attempt should be made to eliminate the water molecules from the barium hydroxide after the formation of the oxygen generator, the oxygen generator would be consumed.

The barium peroxide has been included in the oxygen generators of the prior art to react with free chlorine liberated from the sodium chlorate during the combustion of the fuel in the generator. Actually, because of the entrapment of the water molecules in the barium hydroxide and the conversion of the barium peroxide to barium hydroxide octahydrate, the barium peroxide has not been able to react chemically with the free chlorine. What has actually happened has been the decomposition of the sodium chlorate to sodium chloride (NaCl) and oxygen and the melting of the sodium chloride (NaCl) at a temperature of approximately 248° C. and the vaporization of the sodium chloride at a temperature of approximately 1414° C. The vaporization of sodium chloride is produced at the points of combustion of the fuel and the oxygen liberated from the chlorate even though the average temperature in the reaction zone is in the order of 700° C. to 800° C. When the sodium chloride becomes vaporized, it reacts with water released from the barium hydroxide octahydrate as follows:

$$NaCl + H_2O \rightarrow HCl + NaOH. \qquad (1)$$

As is well known, hydrochloric acid (HCl) is noxious. Furthermore, hydrochloric acid vaporizes quite easily so that it is breathed by the people in the vicinity of the oxygen generator. Furthermore, heat is absorbed in such a reaction so as to inhibit the continued liberation of oxygen from the generator. The heat absorbed is in the dehydration of the barium peroxide octahydrate to make water molecules available for reaction with the sodium chloride. Since this heat is absorbed at the combustion zone, it decreases the heat available to decompose the sodium chlorate.

When the water molecules are released from the barium hydroxide octahydrate at a temperature of approximately 550° C., the water molecules tend to produce a vapor at the surface of the oxygen generator. This tends to inhibit further combustion of the fuel (iron powder) and the oxygen liberated from the sodium chlorate. Furthermore, the high heat capacity and heat vaporization of the water reduce the net enthalpy resulting from the heat liberated by the decomposition of the sodium chlorate to sodium chloride and free oxygen and the combustion of the fuel with the free oxygen. This reduction in the net enthalpy may be so great as to cause the oxygen generator to become extinguished or even to prevent the fuel in the generator from becoming ignited.

Manganese powder has sometimes been used as the fuel in oxygen generators. In the presence of moisture such as water or a fine spray or as a vapor (steam) added during the mixing process, manganese exhibits dangerous properties. This may be seen from the following chemical reaction:

$$Mn + H_2O \rightarrow MnO + H_2 \qquad (2)$$

The liberation of hydrogen in the presence of atmospheric oxygen sometimes produces an explosive gas mixture. The explosive reaction of the hydrogen and the oxygen is facilitated by the heat liberated from the exothermic reaction of manganese and water.

The production of the oxygen generators specified above has generally occurred in the presence of a significant amount of water. This significant amount of water has been as high as 5% of the weight of the oxygen generator. For the reasons discussed above, the water has been retained in the oxygen generator even though there has been a conscious desire, and even attempt, to remove such moisture from the generator.

U.S. Pat. No. 4,101,291 issued to me on July 18, 1978, for "Oxygen Gas Generator and Method of Manufacturing the Gas Generator" discloses and claims an oxygen generator which overcomes the above difficulties. The oxygen generator includes a binder which is not hydrophyllic and which has the properties of remaining in solid form even while the fuel in the generator is being combusted. The binder has the properties of retaining the fuel dispersed throughout the binder rather than being bunched as in the prior art. The binder provides good strength even while green. By "green" is meant the undried or uncured state of the freshly pressed or consolidated candle ingredients.

The oxygen generator of U.S. Pat. No. 4,101,291 also includes a fuel which is not hazardous and which does not emit noxious fumes when combusted. The fuel is provided in the form of relatively large particles which are uniformly dispersed in the binder in isolated relationship to one another. In this way, combustion of the fuel occurs at isolated or localized positions with the production of concentrated heat and high temperatures at these isolated or localized positions. This prevents a continuous liquid interface of molten sodium chloride from being produced between the combustion zone and the decomposed candle. Molten sodium chloride is still produced in this invention at random positions but the molten sodium chloride has an opportunity to cool and solidify at these positions after the fuel has been consumed at these positions.

By providing for the combustion of the fuel at the isolated or localized positions, the combustion is also sustained on a controlled basis such that the combustion can be interrupted at any time desired. This can be accomplished by bending or breaking the candle along the surface of the combustion. Furthermore, the combustion occurs at a slower rate in certain embodiments of the generators of the invention in U.S. Pat. No. 4,101,291 than in the generators of the prior art so that a generator of minimal weight can be provided for a reaction intended to continue over a predetermined period of time.

The amount of fuel used in the oxygen generator of U.S. Pat. No. 4,101,291 is less than the amount of fuel included in oxygen generators of the prior art. The combined embodiment of fuel, binder and catalyst used in the oxygen generator of the invention of U.S. Pat. No. 4,101,291 is less than that in the prior art. In this way, the amount of oxidizer included in the generator of the invention of U.S. Pat. No. 4,101,291 is substantially increased.

Although the gas generators specifically disclosed in U.S. Pat. No. 4,101,291 have been found to be generally satisfactory for all purposes, the temperature of combustion of the fuel has sometimes been found to be a little higher than the optimum temperature for initiating combustion of fuel which is otherwise hard to ignite. For example, this has been particularly true when the gas generator has been used to initiate the burning of such fuel as charcoal briquettes.

This invention provides a gas generator which is ignited at a lower temperature than the generators specifically disclosed in U.S. Pat. No. 4,101,291. In this way, the gas generator of this invention provides an optimum temperature for initiating combustion of such fuel as charcoal briquettes.

The gas generator of this invention includes a suitable refractory material (such as clay) as a binder and a suitable oxidizer such as a chlorate. The generator also includes a fuel having properties of combusting with oxygen liberated by the oxidizer and having a granular construction and having relatively poor thermal conductivity through the granules to provide the combustion at localized positions in the refractory material. The fuel may constitute a plant by-product having a cellular structure and a high compression strength. The fuel may specifically constitute dried plant life such as corn cobs.

A suitable clay such as bentonite is preferably used as the binder in the oxygen generator of this invention. Bentonite constitutes a hydrous aluminum silicate found, for example, in Wyoming. It may be defined as a colloidal clay of the montmorillonite mineral group. It swells in water or with the addition of water and carries sodium as its predominant exchangeable ion. It may be classified nominally as $Na_2O\text{-}CaO\text{-}6\ Al_2O_3\text{-}36SiO_2\text{-}0.7Fe_2O_3$. A typical percentage by weight of the different materials in bentonite is as follows:

| Material | Percentage(%) |
| --- | --- |
| Silica (SiO$_2$) | 69.76 |
| Alumina (Al$_2$O$_3$) | 16.84 |
| Ferric Oxide (Fe$_2$O$_3$) | 3.51 |
| Lime (CaO) | 1.80 |
| Magnesia (MgO) | 0.97 |
| Soda (Na$_2$O) | 1.95 |

| -continued | |
|---|---|
| Material | Percentage(%) |
| Potash (K$_2$O) | 0.20 |

It will be appreciated, however, that different bentonite deposits will have different compositions from that specified above. Bentonite having a relatively high percentage of sodium may be used as the binder in oxygen candles. The igniters for charcoal briquettes may use either sodium bentonite or calcium bentonite or a mixture of various bentonites to provide desired properties of processing or cured strength.

A clay such as bentonite begins to soften at about 1037° C., and fusion occurs at 1337° C. to form a refractory matrix material. When the oxygen candle is ignited, the bentonite binder tends to lose slightly less than 6% of its weight through vaporization of chemically held water and other causes. Since the clay binder may represent 7% of the candle formula, the chemically held water may be less than 0.5% of the candle weight.

Bentonite has a good thermal conductivity so as to transfer heat between the different localized hot spots as the fuel in the generator is combusted. Actually, the bentonite has a better thermal conductivity than sodium chlorate, which is included as the oxidizer in the generator. In this way, the clay such as bentonite tends to sustain the combustion of the fuel after such combustion has been initiated.

Since it is essentially a refractory material, bentonite does not melt or flow even when subjected to high temperatures such as occur when the fuel in the generator is combusted. A clay such as bentonite offers the further advantage of quiet and ready release of water at temperatures below the boiling point of water, with negligible retention of molecules of water. It is easily mixed uniformly with the fuel and the oxidizer to form a homogeneous mixture.

Preferably the clay such as bentonite is retained in the mixture in a range to 38% by weight when the generator is used as an igniter for charcoal briquettes. However, the bentonite can be included in the range to 15% by weight, particularly when it is used as an igniter for charcoal briquettes. As the percentage of bentonite in the generator is increased, the combustion of the fuel becomes correspondingly inhibited since the bentonite tends to isolate the different fuel particles.

Lignin may also be used as the binder. The lignin may be used alone or in combination with bentonite or a suitable material such as calcium carbonate or both the bentonite and the calcium carbonate. When lignin is used in combination with calcium carbonate, the sodium ligno sulfonate (lignin) combines with the calcium carbonate to form calcium sulfate and sodium carbonate. By way of illustration, the mixture may include as the binder a combination of approximately 5% to 10% by weight of bentonite, approximately 1% to 5% by weight of lignin and approximately 1% to 3% by weight of calcium carbonate.

An oxydizer offering particular advantages for use in the oxygen generator of this invention is a chlorate such as sodium chlorate. This oxydizer releases considerable amounts of oxygen under controlled conditions. It also reacts well with different fuels. However, other oxydizers may also be used. These include other chlorates.

A fuel is provided which preferably has a cellular structure. For example, granulated corn cobs may be used as the fuel. Such a fuel has certain important advantages. By way of illustration, it provides for the ignition of the oxygen generator at a relatively low temperature such as approximately 202° C. Ignition at such a temperature is desirable because a lighted match is capable of providing such a temperature.

The cellular structure of the granules and the cellulosic nature of the corn cob provide for a relatively poor thermal conductivity through the granules. This causes heat from an external source of ignition to be concentrated and localized at the point of heat application. These factors combine to provide an exceptional ease of ignition from the flame of a match or other similar source of ignition.

The use of a fuel such as granulated corn cobs is also advantageous for other reasons. It constitutes a "clean" fuel and produces no offensive odors when burned. In this respect the corn cobs are advantageous over coal, which produces a bituminous odor when burned. Furthermore, it constitutes a natural source which is annually renewable. If anything, the renewability of the source is further advantageous because it provides a utility to material which might otherwise have to be disposed of.

There are even other advantages to the use of a cellular fuel such as corn cobs. For example, corn cobs have a high compression strength such as in the order of 52,000 psi. Because of this, the charcoal briquettes can be formed by exerting a high pressure against the mixture of the binder, the fuel and the oxidizer. Furthermore, the charcoal briquettes can be formed from a dry mixture of the binder, the fuel and the oxizider. Formation of the briquettes from a dry mixture is advantageous because it provides a saving of fuel otherwise required to dry the mixture and because it tends to reduce the temperature at which the fuel can be ignited and the ignition can be sustained.

Although bentonite requires a temperature of 1137° C. for fusion, local temperatures greater than 1400° C. are produced at the localized positions of combustion of the fuel. This may be seen from the fact that a salt fog (or vapor) of sodium chloride is produced at the face of the oxygen generator. Sodium chloride vaporizes at a temperature in excess of 1411° C. When the oxygen generator is used as an oxygen candle, the salt fog is removed by filtering because the salt fog tends to make the flame yellow.

Generally, not all of the fuel is consumed in the combustion process. One reason is that corn cob is diluted somewhat by the ash content of the fuel. Another reason is that the corn cob is encapsulated by the binder such as the bentonite. Since the combustion occurs on a localized basis, not all of the fuel is accessible to the combustion because of the encapsulation by the clay.

Preferably the particles of fuel should not be too small, such as in a finely divided powder. When a finely divided powder is used, the entire combustion zone is liquefied to such a depth as to cause flow of the molten sodium chlorate. This flow tends to extinguish the combustion, particularly since the flow is often away from the area of combustion. The use of a finely dispersed powder as the fuel is particularly undesirable when the generator is to be used as a free standing candle.

The heat from the igniter should be controlled within certain limits when the generator is used as an oxygen candle. If the heat from the igniter is too great, the oxygen candle will melt below the combustion zone and flow away from the zone, thereby causing the combustion zone to become extinguished.

When the oxygen generator is used as an oxygen candle, it provides insulation except at the surface where it is being combusted. For example, the oxygen candle can be manually handled by grasping it at a position a fraction of an inch removed from the surface of combustion. Furthermore, the candle can be extinguished by placing it on its side and cutting or breaking the ash from the parent material. This causes the ash to fall away from the remainder of the material in the candle and the remainder of the material to be saved for a subsequent combustion.

When the oxygen generator is used to ignite charcoal briquettes, the oxygen generator can be activated by striking it on the strip included on match books for igniting matches. The heat generated by the friction between the match strip and the oxygen generator is sufficient to ignite the fuel in the oxygen generator. This occurs through the following chemical reaction:

$$P + NaClO_3 \rightarrow P_2O_3 + NaCl \qquad (3)$$

As will be appreciated, the phosphorous in the above chemical reaction is obtained from the match strip. The heat generated by the above reaction causes oxygen to be released by the sodium chlorate. This oxygen in turn reacts with the fuel in the generator to produce combustion and generate additional heat. By generating excess oxygen, heat is liberated and the oxygen is freed to combust with the charcoal briquettes. In addition, relatively little salt fog is produced to inhibit combustion.

Corn cobs having a weight as high as approximately 20% in the mixture have been used with a binder having a weight as high as approximately 38% to ignite charcoal briquettes. In such a mixture, the predominantly carbon fuel becomes combusted to carbon monoxide and hydrogen. These combustible gases then undergo secondary combustion with atmospheric oxygen to produce water and carbon dioxide. Such combustion causes temperatures in excess of 1800° C. to be produced. Although the charcoal or other combustible fuel is enveloped in a reducing atmosphere, the heat transfer is more than adequate to raise such combustibles above their auto ignition temperatures. This causes the combustibles to ignite and sustain combustion with atmospheric oxygen after the igniter is consumed. However, salt fog tends to be produced. The salt fog tends to inhibit the surface of the combustible fuel from direct contact with the atmospheric oxygen that it needs to support ignition and combustion. As a result, the use of a relatively high percentage of fuel in an igniter for charcoal briquettes is not as desirable as those igniters which provide a reduced amount of fuel and which generate oxygen.

Different percentages of the binder, the fuel and the oxidizer have been successfully used. For example, the following percentage ranges have been found to be successful in igniting charcoal briquettes:

| Material | Range of percentages |
|---|---|
| Fuel such as corn cobs | 10% |
| Binder such as clay | 15% |
| Oxydizer such as chlorate | 75% |

When an oxygen generator such as that specified above is used to ignite charcoal briquettes, the oxygen generator can generally be ignited by striking on a matchbook cover because the percentage of oxidizer in the mixture is relatively high. Generally, the oxygen generator can be ignited by striking on a matchbook cover when the percentage of oxidizer in the generator is at least sixty percent (60%).

Sometimes it is desired to prevent the oxygen generator from being ignited by striking on a matchbook cover, but retain ease of ignition from the flame of a match. Under such circumstances, the percentage of the oxidizer in the mixture may be reduced to a suitable percentage such as approximately fifty percent (50%). Under such circumstances, the oxygen generator may have a composition such as follows:

| Material | Range of percentages |
|---|---|
| Fuel such as corn cobs | 12% to 20% |
| Binder such as clay | 30% to 38% |
| Oxidizer such as chlorate | 50% |

When the oxidizer is reduced to fifty percent (50%), the percentage of binder is increased to provide additional filler to compensate for the decrease in the relative amount of the binder. The relative amount of the fuel is also increased because some of the fuel tends to be encapsulated by the binder and accordingly is not available to be oxidized.

The oxidizer described above has certain advantages in addition to those set forth above. For example, a percentage by weight as high as 75% for the oxidizer is considerably greater than that provided for the oxidizer in the generators of the prior art other than that set forth in my U.S. Pat. No. 4,101,291. Furthermore, since the amount of fuel is relatively low in the generator of this invention and since the combustion of the fuel is quite efficient, a considerably larger percentage of oxygen is available in the generator of this invention for subsequent use than in the generators of the prior art.

The technical grade of sodium chlorate used in the oxygen generator preferably has a minimum purity of 99.5%. The sodium chlorate preferably has a maximum content of 0.12% of sodium chloride by weight and a maximum content of 0.20% of water by weight. It is preferably produced by electrolysis of an aqueous solution of technically pure sodium chloride.

Preferably a generator to be used as an oxygen candle has a cylindrical shape similar to that of an ordinary candle and a generator to be used as an igniter for charcoal briquettes has the shape of a cylindrical rod, which may be approximatly 4 inches long and may have a diameter of approximately one half inch. All portions of the candle or rod form a uniform mixture. Although the igniter for the charcoal briquettes is preferably in the form of a cylindrical rod, other shapes such as discs and spheres may also be used. The generator may also be in other shapes than cylindrical when it is used as an oxygen candle.

One practical limit of fuel would be the stoichiometric properties for converting all carbon to carbon dioxide. This may be of interest in some applications as a hot gas generator. A formula for producing such conversion is as follows:

$$6C + 4NaClO_3 \rightarrow 4NaCl + 6CO_2 \qquad (4)$$

When the binder constitutes approximately 15% of the generator and when allowance is made for ash residue in the fuel, fuel having a weight of approximately 10% in the generator is needed to achieve this stoichiometry with approximately 75% by weight of sodium chlorate.

The oxygen generator described above may be formed by dry blending the different particles and granules and then introducing the dry blend into a briquetting machine. In the briquetting machine, the dry blend is subjected to a high compression to form briquettes. Since the briquettes are produced from a dry blend, no fuel is required to dry the blend as in the prior art. Furthermore, the briquettes are advantageous because it has been difficult in the prior art to eliminate all water and any water remaining in the generator has inhibited combustion and the generation of oxygen for igniting the charcoal briquettes.

To ignite charcoal briquettes, a layer of charcoal briquettes is first disposed on a surface. Several rods of the oxygen generator constituting this invention are then disposed on the layer of charcoal briquettes with the ends of such rods protruding from the layer of charcoal briquettes. Additional briquettes are then disposed on the first layer and the rods.

The rods are then ignited as by a match. As the rods burn, they liberate considerable amounts of oxygen at high temperatures. This liberated oxygen reacts chemically with the charcoal in the briquettes to ignite the briquettes. In this way, temperatures in excess of 2300° F. are produced so that, in a relatively short time, food is ready to be barbequed on the smoldering briquettes.

Although this application has been disclosed and illustrated with reference to particular applications, the principals involved are susceptible to numerous other applications which will be apparent to persons skilled in the art. The invention is, therefore, to be limited only as indicated by the scope of the appended claims.

I claim:

1. In combination in a dry mixture free from petroleum-based commponents,
   a clay having non-hydrophyllic properties and having a percentage by weight no greater than approximately thirty-eight percent (38%) in the mixture,
   an oxidizer having a percentage by weight no greater than approximately seventy-five percent (75%) in the mixture, and
   a fuel having a cellulosic composition and having a percentage by weight no greater than approximately twenty percent (20%) in the mixture.

2. The combination set forth in claim 1, wherein
   the clay has a range between approximately thirty percent (30%) to thirty-eight percent (38%) by weight,
   the oxidizer has a range to approximately fifty percent (50%) by weight, and
   the fuel has a range between approximately twelve percent (12%) and twenty percent (20%) by weight and
   the clay, the oxidizer and the fuel are the only materials in the mixture.

3. The combination set forth in claim 1, wherein
   the clay constitutes bentonite,
   the oxidizer constitutes a chlorate and
   the fuel constitutes corn cob and
   the clay, the oxidizer and the fuel are the only materials in the combination.

4. The combination set forth in claim 1 wherein
   the clay has a range to approximately fifteen percent (15%) by weight and the fuel has a range to approximately ten percent (10%) by weight.

5. The combination set forth in claim 4 wherein
   the clay constitutes bentonite
   the oxidizer constitutes a chlorate and
   the fuel constitutes particles of corn cob and
   the clay, the oxidizer and the fuel are the only materials in the mixture.

6. In combination in a combustible mixture free from petroleum-based components,
   a refractory material providing a non-hydrophyllic binder,
   an oxidizer having properties of decomposing to liberate oxygen, and
   a fuel having properties of combusting with oxygen liberated by the oxidizer and having a cellular and granulated construction and having relatively poor thermal conductivity through the granules to provide the combustion at localized positions in the refractory material,
   the refractory material having properties of softening and fusing at temperatures below the temperatures of combustion at the localized positions.

7. The combination set forth in claim 6,
   the mixture being substantially free of water and the fuel being cellulosic and particulate.

8. The combination set forth in claim 6,
   the refractory material having a range to approximately thirty-eight percent (38%) by weight,
   the oxidizer having a range to approximately seventy-five percent (75%) by weight and
   the fuel having a range to approximately twenty percent (20%) and being cellulosic and particulate,
   the refractory material, the oxidizer and the fuel being the only materials in the mixture.

9. The combination set forth in claim 8 wherein
   the fuel constitutes a plant by-product having a cellular structure and a high compression strength.

10. The combination set forth in claim 9 wherein
    the refractory material constitutes a clay and the fuel constitutes a plant having a combustible temperature of approximately 400° F. and wherein the refractory material, the fuel and the oxidizer are compressed in dry form into a unitary structure.

11. The combination set forth in claim 10 wherein
    the clay constitutes bentonite and the fuel constitutes particles of corn cob.

12. The combination set forth in claim 8 wherein
    the refractory material has a range between approximately thirty percent (30%) and thirty-eight percent (38%) by weight and
    the oxidizer has a range to approximately fifty percent (50%) by weight and
    the fuel has a range between approximately twelve percent (12%) and twenty percent (20%) by weight.

13. The combination set forth in claim 8 wherein
    the refractory material has approximately fifteen percent (15%) by weight,
    the oxidizer has approximately seventy-five percent (75%) by weight and
    the fuel has approximately ten percent (10%) by weight.

14. The combination set forth in claim 12 wherein
    the fuel constitutes a plant by-product having a cellular structure and a high compression strength and the refractory material constitutes a clay.

15. A method of forming a combustible material free of petroleum-based components, including providing a refractory material constituting a nonhydrophyllic binder, providing an oxidizer having properties of decomposing to liberate oxygen, providing particles of a fuel having properties of combusting with the oxygen liberated by the oxidizer and having a high compression strength and having a granular construction and having relatively poor thermal conductivity through the granules to provide the combustion at localized positions in the refractory material, the refractory material having properties of softening and fusing at temperatures below the temperatures of combustion at the localized positions, mixing the refractory material, the oxidizer and the fuel in their dry states and without the addition of water, and compressing the refractory material, the oxidizer and the particles of the fuel to form a briquette.

16. The method set forth in claim 15 wherein the fuel constitutes particles of a dried plant having a cellular structure, the refractory material constitutes a clay and the oxidizer constitutes a chlorate.

17. The method set forth in claim 16 wherein the fuel constitutes particles of corn cob and the refractory material constitutes bentonite.

18. The method set forth in claim 15 wherein the refractory material is in a range to approximately thirty-eight percent (38%) by weight, the fuel is in a range to approximately twenty percent (20%) by weight and the oxidizer is in a range to approximately seventy-five percent (75%) by weight and only the refractory material, the fuel and the oxidizer are mixed.

19. The method set forth in claim 15 wherein the refractory material constitutes a clay, the fuel constitutes particles of a dried plant having a cellular structure and the oxidizer constitutes a chlorate and only the refractory material, the fuel and the oxidizer are mixed.

20. The method set forth in claim 19 wherein the clay has approximately fifteen percent (15%) by weight, the dried plant has approximately ten percent (10%) by weight and the oxidizer has approximately seventy-five percent (75%) by weight.

21. The method set forth in claim 16 wherein the refractory material constitutes approximately thirty percent (30%) to thirty-eight percent (38%) by weight and the fuel constitutes approximately twelve percent (12%) to twenty percent (20%) by weight.

22. The method set forth in claim 21 wherein the refractory material constitutes a clay, the fuel constitutes particles of a dried plant having a cellular structure and the oxidizer constitutes a chlorate.

23. The method set forth in claim 22 wherein the clay constitutes particles of bentonite and the dried plant constitutes corn cob.

* * * * *